(12) United States Patent
Zhang et al.

(10) Patent No.: US 9,190,920 B2
(45) Date of Patent: Nov. 17, 2015

(54) H-BRIDGE MICRO INVERTER GRID-CONNECTED DEVICE

(75) Inventors: Huaguang Zhang, Shenyang (CN);
Dongsheng Yang, Shenyang (CN);
Guangru Zhang, Shenyang (CN); Gang Wang, Shenyang (CN); Le Li, Shenyang (CN); Xinrui Liu, Shenyang (CN);
Yingchun Wang, Shenyang (CN);
Rijiang Wang, Shenyang (CN); Yang Jiao, Shenyang (CN)

(73) Assignees: Northeastern University, Shenyang, Liaoning (CN); Huaguang Zhang, Shenyang, Liaoning (CN); Dongsheng Yang, Shenyang, Liaoning (CN);
Guangru Zhang, Shenyang, Liaoning (CN); Gang Wang, Shenyang, Liaoning (CN); Le Li, Shenyang, Liaoning (CN); Xinrui Liu, Shenyang, Liaoning (CN);
Yingchun Wang, Shenyang, Liaoning (CN); Rijiang Wang, Shenyang, Liaoning (CN); Yang Jiao, Shenyang, Liaoning (CN)

( * ) Notice: Subject to any disclaimer, the term of this patent is extended or adjusted under 35 U.S.C. 154(b) by 537 days.

(21) Appl. No.: 13/571,628

(22) Filed: Aug. 10, 2012

(65) Prior Publication Data

US 2013/0242617 A1 Sep. 19, 2013

(30) Foreign Application Priority Data

Mar. 15, 2012 (CN) .......................... 2012 1 0069579

(51) Int. Cl.
*H02M 3/335* (2006.01)
*H02M 7/48* (2007.01)
*H02M 1/00* (2007.01)

(52) U.S. Cl.
CPC ........ *H02M 3/33569* (2013.01); *H02M 7/4807* (2013.01); *H02M 2001/007* (2013.01); *Y02E 10/56* (2013.01)

(58) Field of Classification Search
USPC ............ 363/17, 28, 37, 56.05, 58, 95, 96, 98, 363/132, 136
See application file for complete search history.

(56) References Cited

U.S. PATENT DOCUMENTS

| | | | | | |
|---|---|---|---|---|---|
| 4,497,018 | A | * | 1/1985 | Rice | 363/96 |
| 4,647,830 | A | * | 3/1987 | Bees | 363/58 |
| 4,792,885 | A | * | 12/1988 | Cuman et al. | 363/16 |
| 4,853,835 | A | * | 8/1989 | Furuhashi | 363/58 |

(Continued)

*Primary Examiner* — Jeffrey Sterrett
(74) *Attorney, Agent, or Firm* — Lin & Associates Intellectual Property, Inc.

(57) ABSTRACT

An H-bridge micro inverter grid-connected device is invented to solve the problem that failure of any photovoltaic panel on the existing solar photovoltaic system cascade can cause efficiency reduction of the whole photovoltaic panel module. The H-bridge micro inverter grid-connected device comprises a single-chip microcomputer controller, a CPLD controller, a MOSFET full-bridge circuit, a high-frequency transformer, a half-bridge rectifying circuit, an SCR full-bridge circuit and a filter circuit, wherein the MOSFET full-bridge circuit is in the full-bridge type, the high-frequency transformer is a single-phase transformer with a central tap, and the SCR full-bridge circuit is applied. The integral structure above is characterized by the decreasing number of components, the reduction of power switches, and the simplification of the control circuits and driving circuits, so as to decrease the number of full-control switch components, improve the system reliability and reduce the system costs.

12 Claims, 11 Drawing Sheets

(56) References Cited

U.S. PATENT DOCUMENTS

| | | | |
|---|---|---|---|
| 5,841,647 A * | 11/1998 | Hoshi | 363/56.12 |
| 6,330,170 B1 * | 12/2001 | Wang et al. | 363/37 |
| 6,563,723 B2 * | 5/2003 | Nadot et al. | 363/57 |
| 6,597,590 B2 * | 7/2003 | Ikimi et al. | 363/58 |
| 7,733,670 B2 * | 6/2010 | Feng et al. | 363/17 |
| 2013/0242617 A1 * | 9/2013 | Zhang et al. | 363/17 |
| 2013/0250624 A1 * | 9/2013 | Fornage | 363/17 |
| 2013/0343092 A1 * | 12/2013 | Lin et al. | 363/17 |

\* cited by examiner

H-BRIDGE MICRO INVERTER GRID-CONNECTED DEVICE

BACKGROUND OF THE INVENTION

1. Field of the Invention

The present invention relates to an H-bridge micro inverter grid-connected device which belongs to the technical field of electrical engineering.

2. The Prior Arts

The common existing inverter grid-connected devices operate in high power. Many photovoltaic panels are needed to be connected in series in several groups, and then, different series photovoltaic panel modules are connected in parallel to form a photovoltaic array. DC generated by the solar panel array converges to the inverter beside the solar panel. In such photovoltaic system, the solar panel is formed by connecting multiple series photovoltaic panel modules in parallel. Like festival lights, if a battery in the series circuit does not work, the whole battery pack will fail. In addition, the situation can also occur when a partial shadow or particles shade the photovoltaic system. The result is that power generating capacity of solar energy decreases by 50% if only 10% of the solar photovoltaic system is shaded. The situation above is caused by unreasonable structure of the existing photovoltaic systems, which affects reliability, costs and efficiency of inversion. The reason is that multi-photovoltaic panel cascaded convergence inversion causes the fact that failure of some solar photovoltaic panels affects the whole photovoltaic power generation system. If the photovoltaic power generation structure above is not used, one method of the common existing inverters is that inversion to low-voltage AC is performed firstly, and then, the low-voltage AC is transformed by a self-adjusting power frequency transformer to AC which conforms to grid-connected requirements. However, the method requires high performance of transformers, and transformers are expensive and huge to users. Still, although the inverter circuit is simplified, the transformers have poor economical efficiency and reliability. Another common method is that the voltage of the current is boosted to a certain range by the DC/DC boost circuit firstly, and then, the current is inverted to AC of power frequency which conforms to grid-connected requirements. The common DC/DC method of high reliability and high stability needs many full-control switches and power diodes to design the whole solar inverter grid-connected device, so the method has the disadvantages of high costs, complex control and difficult system maintenance.

SUMMARY OF THE INVENTION

In terms of the disadvantages of the prior art, the present invention provides an H-bridge micro inverter grid-connected device to reduce the number of full-control switch components, improve the system reliability and decrease the system costs.

The present invention relates to an H-bridge micro inverter grid-connected device, comprising: two controllers, an MOSFET H full-bridge circuit, a high-frequency transformer, a half-bridge rectifying circuit, an SCR H full-bridge circuit and a filter circuit. The two controllers are respectively the controller for processing collected signals and calculations and the controller for outputting pulse signals, the MOSFET H full-bridge circuit is used to invert DC signals outputted by photovoltaic panels to high-frequency AC signals, and the high-frequency transformer is used to boost the voltage of the high-frequency AC signals inverted by the MOSFET H full-bridge circuit to the voltage which conforms to the grid-connected amplitude; the half-bridge rectifying circuit is used to convert output signals of the high-frequency transformer to half sine wave signals, the SCR H full-bridge circuit is used to convert the half sine wave signals outputted by the half-bridge rectifying circuit to sine wave signals which conform to grid requirements, and the filter circuit is used to filter harmonic waves in the sine waves outputted by the SCR H full-bridge circuit and convert the output sine waves to sine waves which conform to grid requirements.

The MOSFET H full-bridge circuit comprises an MOSFET transistor H full-bridge circuit and protection circuits. Drain electrodes of the first MOSFET transistor (Q1) and the third MOSFET transistor (Q3) are connected with the high voltage side of the photovoltaic panels, and drain electrodes of the second MOSFET transistor and the fourth MOSFET transistor are connected with the low voltage side of the photovoltaic panels; the source electrode of the first MOSFET transistor is connected with the drain electrode of the second MOSFET transistor, and the source electrode of the third MOSFET transistor is connected with the drain electrode of the fourth MOSFET transistor.

The four MOSFET transistors of the MOSFET transistor H full-bridge circuit are respectively provided with four protection circuits with the same structure, each of which comprises a resistor, a capacitor and a diode. The resistor is connected with the capacitor in series, and the connection between the resistor and the capacitor is connected with the cathode of the diode; the other terminal of the capacitor is connected with the drain electrode of the MOSFET transistor, and the other terminal of the resistor is connected with the source electrode of the MOSFET transistor and the anode of the diode.

One terminal of the primary coil of the high-frequency transformer is connected with the center of a bridge arm formed by the first MOSFET transistor and the third MOSFET transistor, and the other terminal of the primary coil of the high-frequency transformer is connected with the center of a bridge arm formed by the second MOSFET transistor and the fourth MOSFET transistor; both terminals of the secondary coil of the high-frequency transformer are respectively connected with the half-bridge rectifying circuit, and the central tap of the secondary coil of the high-frequency transformer is connected with the SCR H full-bridge circuit.

The half-bridge rectifying circuit comprises diodes and filter capacitors. One terminal of the secondary coil of the high-frequency transformer is connected with the anode of the first diode, and the other terminal of the secondary coil of the high-frequency transformer is connected with the anode of the second diode; the cathode of the first diode is connected with one terminal of the first filter capacitor, and the other terminal of the first filter capacitor is connected with the central tap of the secondary coil of the high-frequency transformer; the cathode of the second diode is connected with one terminal of the second filter capacitor, and the other terminal of the second filter capacitor is connected with the central tap of the secondary coil of the high-frequency transformer.

The SCR H full-bridge circuit comprises an SCR transforming bridge circuit. The SCR transforming bridge circuit comprises thyristors. Anodes of both the first thyristor and the third thyristor are connected with the cathodes of the first diode and the second diode in the half-bridge rectifying circuit, and the cathode of the first thyristor is connected with the anode of the second thyristor; the cathode of the third thyristor is connected with the anode of the fourth thyristor, cathodes of the third thyristor and the fourth thyristor are connected with the central tap of the secondary coil of the high-frequency transformer.

The thyristors are provided with protection circuits with the same structure, each of which comprises resistors and capacitors. One terminal of the first resistor and one terminal of the first capacitor are connected with the anode of the thyristor, and the other terminal of the first capacitor is connected with one terminal of the second resistor; the other terminal of the second resistor and one terminal of the second capacitor are connected with the cathode of the thyristor, the other terminal of the second capacitor is connected with the gate of the thyristor, and the other terminal of the first resistor and the gate of the thyristor are used as input terminals of voltage driving signals.

The filter circuit comprises a resistor, capacitors and an inductor. The connection between the first thyristor and the second thyristor is connected with one terminal of the inductor, and the other terminal of the inductor is connected with one terminal of the first capacitor, one terminal of the second capacitor and the grid; the other terminal of the second capacitor is connected with one terminal of the resistor, and the other terminal of the resistor is connected with the other terminal of the first capacitor and the grid.

The H-bridge micro inverter grid-connected device has the following advantages: Diagonal switches of the MOSFET H full-bridge circuit perform alternate conduction to Q1 and Q4 as well as Q2 and Q3. Under steady conditions and during conduction of each group of the diagonal switches, the voltage applied to the primary coil of the transformer is exactly the input voltage, which is different from the traditional half-bridge structure that the voltage during conduction of a switch is one half of the input voltage. Meanwhile, the structure enables the micro inverter switch to withstand low voltage stress when the switch is off. If the push-pull structure is applied, the voltage is two times higher than the input voltage. An H full-bridge type is applied in the present invention, so that the requirements for components are reduced, and costs are decreased. The high-frequency transformer with a central tap is applied. On the one hand, alternate conduction through the power diodes D1 and D2 can prevent saturation in the magnetic core of the transformer. On the other hand, the structure can reduce the number of power rectifying diodes so as to reduce the number of power components and decrease costs. Before the half sine waves are sine waves which conform to grid requirements, the SCR H full-bridge circuit is applied in the present invention to reduce the complexity and costs of the circuit. Due to the integral structure above, the number of complex switch components is reduced, and requirements for the power switches are reduced. Therefore, the control circuits and driving circuits become simple, system reliability is improved, and system costs are optimized.

DETAILED DESCRIPTION OF THE PREFERRED EMBODIMENT

Figure 1:
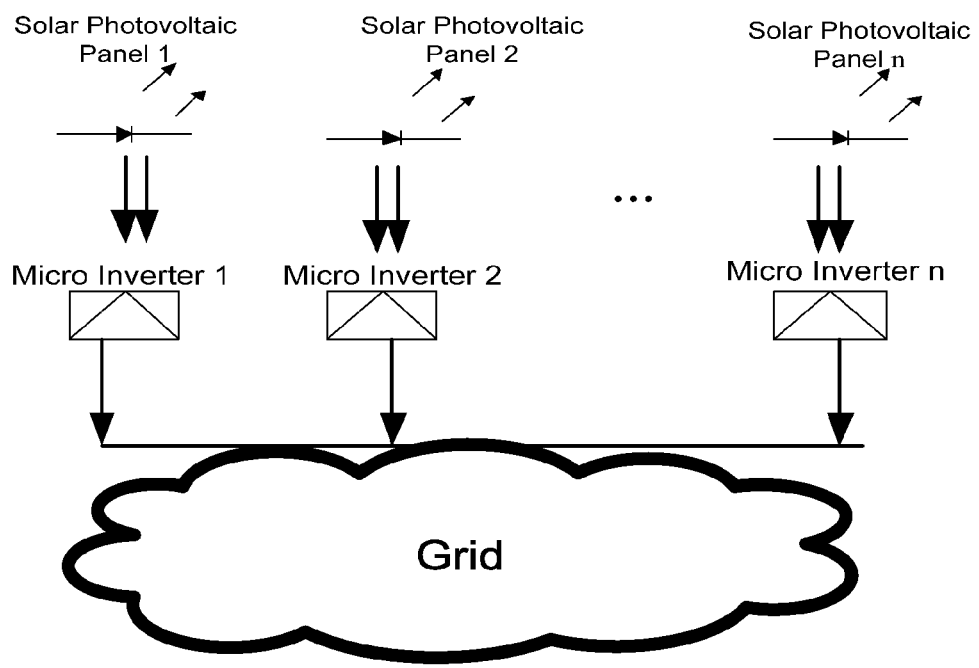
FIG. 1 is the structural diagram of the distributed photovoltaic inverter system in the present invention.

The present invention is further described by figures and the embodiment as follows:

In the embodiment, a new micro inverter circuit topology is provided, and a micro inverter is used, with a wide range of input voltage and minimized inverter power. For example, the 28V~36V input voltage of a 230 W device can boost the voltage above to the voltage which conforms to grid requirements, so that the range of the input voltage is expanded. The micro inverter above is installed on each or some battery panels and connected with the solar photovoltaic panels in a distributed mode, as shown in FIG. 1. The distributed structure can realize improvement of cost effectiveness and efficiency of power generation with solar energy.

Figure 2:
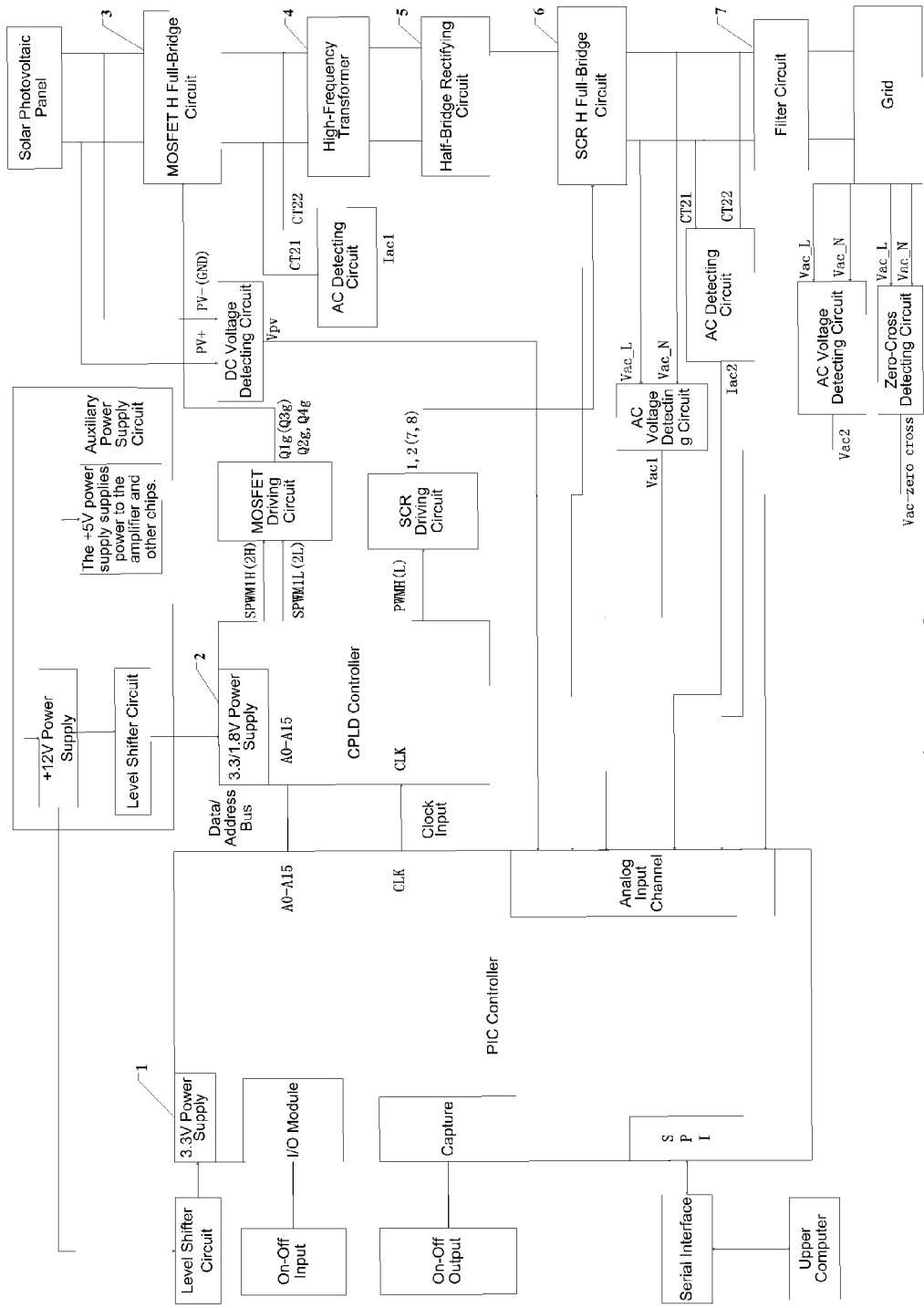
FIG. 2 is the structural diagram of the H-bridge micro inverter grid-connected device in the present invention.
Figure 3:
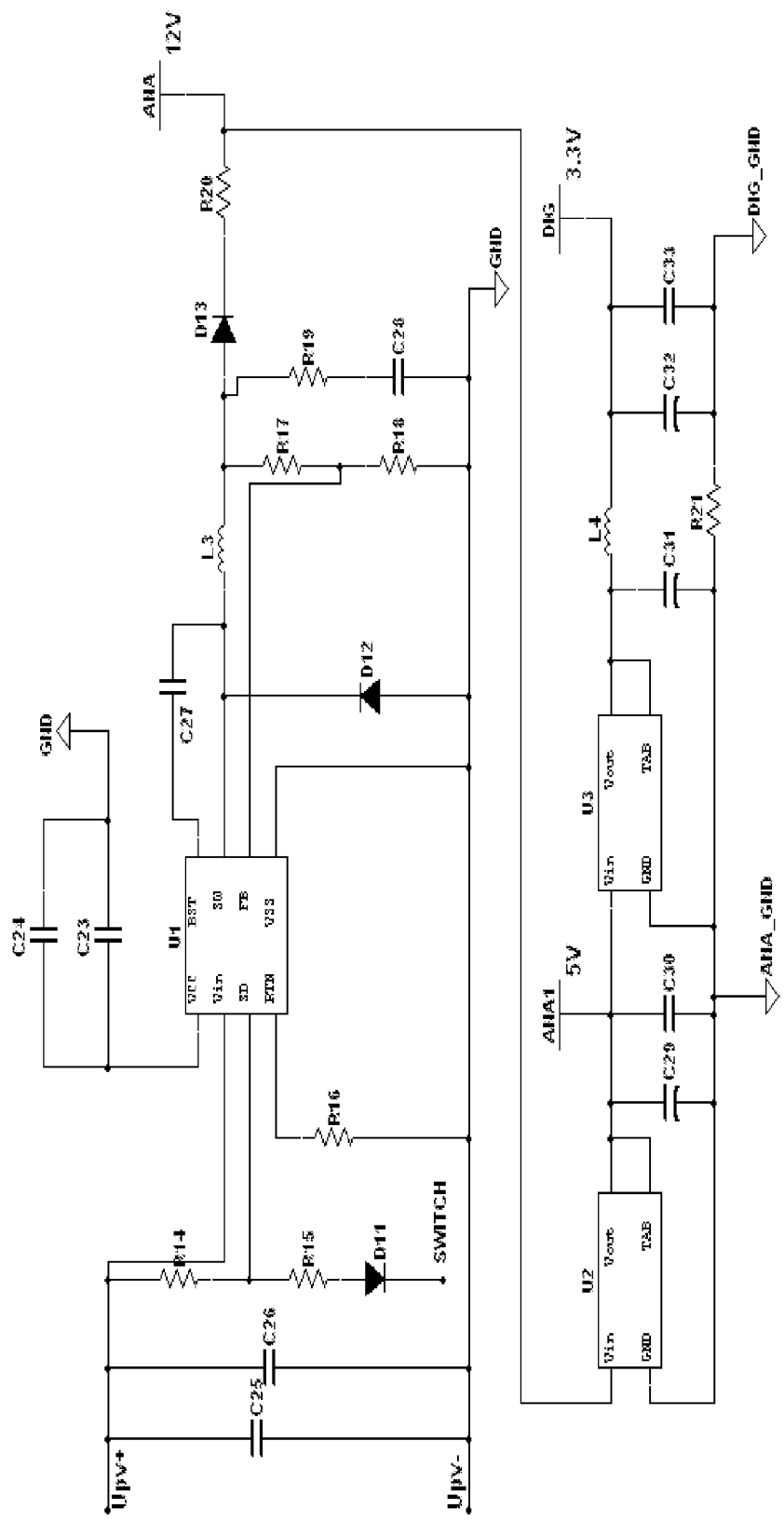
FIG. 3 is the circuit schematic diagram of the single-chip microcomputer and CPLD power supply in the present invention.

FIG. 2 is the structural diagram of the H-bridge micro inverter grid-connected device, comprising a single-chip microcomputer controller 1, a CPLD controller 2, an MOSFET H full-bridge circuit 3, a high-frequency transformer 4, a half-bridge rectifying circuit 5, an SCR H full-bridge circuit 6, a filter circuit 7 and corresponding detecting circuits. Operating processes of the whole system are described based on the structural diagram of the device. After the system is connected and powered, the input voltage of both the grid and the solar photovoltaic panels is detected to ensure that the input voltage of the solar photovoltaic panels (PV panels) is within the range of the acceptable wide input voltage of the H-bridge micro inverter grid-connected device. Moreover, the grid is in operation, so undervoltage or overvoltage of the grid cannot occur. After meeting these input conditions, CPU of the single-chip microcomputer controller starts to set operating frequencies of the components, and configure the ADC module, the I/O port, the timer and SPI of the system status, etc. After meeting the conditions above, the single-chip microcomputer controller comes into operation and obtains the input voltage of the solar photovoltaic panels through the DC voltage detecting circuit. The output current on the primary side of the high-frequency transformer and the output current of the inverter are obtained through the AC detecting circuit. Grid voltage is obtained through the AC voltage detecting circuit, and the voltage is outputted after inversion by the SCR H full-bridge circuit. The zero-cross point and the phase of the grid voltage are obtained through the zero-cross detecting circuit. All the detecting signals are transmitted to the analog input port of the single-chip microcomputer controller, and all the input signals are obtained after AD sample conversion is performed by the ADC module in the single-chip microcomputer controller. The input signals are calculated through the MPPT algorithm (maximum power point tracking algorithm) and the digital phase-locked loop algorithm to generate reference signals of sinusoidal alternating current, the MPPT algorithm ensures that the solar photovoltaic panels operate at the maximum power point, and the digital phase-locked loop algorithm ensures that the voltage and the current of the inverter formed by the MOSFET H full-bridge circuit are of the same frequency and the same phase as those of the grid. After the generated reference signals of the sinusoidal alternating current are compared with the real alternating current obtained by detection, the duty ratio of the MOSFET transistors to be conducted is calculated through PI control. Then, these data are transmitted to the CPLD controller, and two groups of SPWM waves and one group of PWM waves are obtained through calculation by the CPLD controller according to the obtained calculation data. The SPWM waves are transmitted to the MOSFET driving circuit, and the PWM waves are transmitted to the SCR driving circuit. After passing through the MSOFET driving circuit, the SPWM waves control the MOSFET transistors to generate high-frequency AC. After the voltage of the high-frequency AC is boosted by the transformer, AC which conforms to grid requirements is obtained. Then, half sine waves are obtained by half-wave rectification of D1 and D2. After passing through the SCR driving circuit, the PWM waves control SCR to make conversion of the bun half sine waves to sine waves which conform to grid-connected standard. After AC is obtained, the AC is transmitted to the grid to realize grid-connected power generation.

The CPLD controller can accomplish dual mode output of SPWM and PWM, including two groups of SPWM waves and one group of PWM waves. The SPWM waves are used to control the MOSFET H full bridge to generate high-frequency AC, and SPWM controls alternate conduction of the diagonal Q1 and Q4 as well as Q2 and Q3 to achieve ZVS (zero voltage switch during conduction) and reduce switching loss of the MOSFET transistors. The switching frequency of SPWM is up to 57 KHz to achieve the control accuracy, reduce the volume of the transformer, and decrease the weight of the device. The PWM waves are used to control the SCR H full bridge. Each SCR only needs to be conducted and closed once in one period, so SCR switching loss is greatly reduced. At the same time, synchronous control of diagonal SCRs can be accomplished completely without setting dead time, so the complexity of the driving circuits is reduced, and the efficiency and reliability of the system are improved.

Figure 4:
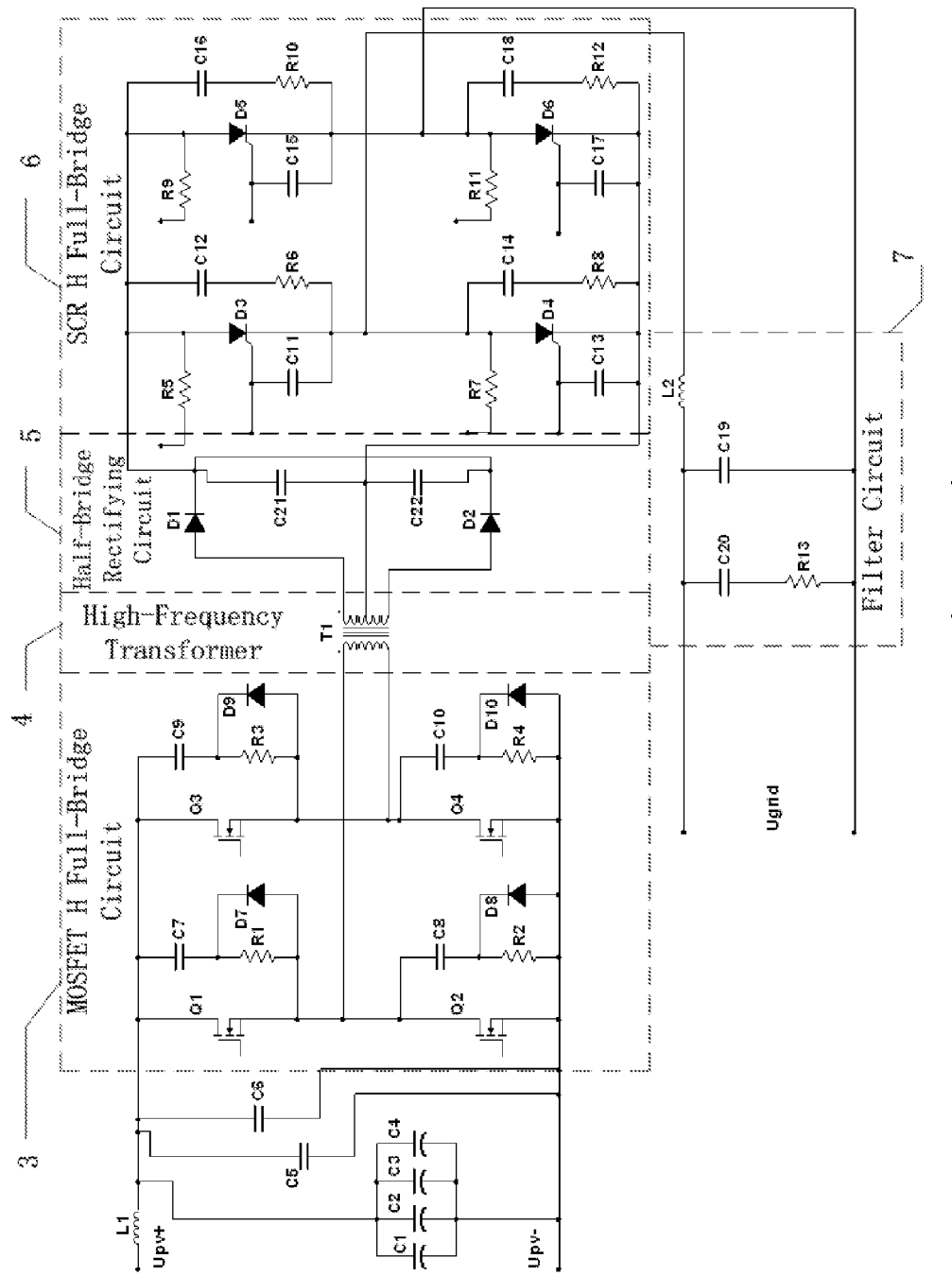
FIG. 4 is the main circuit schematic diagram of the H-bridge micro inverter grid-connected device in the present invention.

FIG. 4 is the main power circuit diagram of a new topology. DC inputted by the solar photovoltaic panels (PV panels) firstly passes through the capacitors C1, C2, C3 and C4 to eliminate ripples, C5 and C6 to eliminate harmonic waves, and then, the DC passes through the MOSFET H full bridge. After passing through the MSOFET driving circuit, the SPWM waves control MOSFET to generate high-frequency AC. Then, the SPWM waves enter the high-frequency single-phase transformer T1 with a central tap for voltage boosting to obtain AC which conforms to grid requirements, and finally, half sine waves are obtained through half-bridge rectification. After passing through the SCR driving circuit, the PWM waves control SCR to make conversion of the half sine waves to sine waves which conform to grid-connected standard. After AC is obtained, the AC is transmitted to the grid for grid-connected power generation.

The MOSFET H full bridge includes Q1, Q2, Q3, Q4 and the protective part of each transistor. The protective part of Q1 comprises C7, R1 and D7, and protective parts of Q2, Q3 and Q4 are with the same structure as that of Q1. The half-bridge rectifying circuit comprises D1, D2 and the filter capacitors C21, C22. The SCR transforming bridge comprises D3, D4, D5, D6 and the protective part of each transistor. The protective parts of D3 are R5, C11, C12 and R6, and the protective parts of D4, D5 and D6 are with the same structure as that of D3. The filter circuit comprises L2, C19, C20 and R13.

For connection of the MOSFET H full-bridge circuit and the protection circuits, the drain electrodes of the MOSFET transistor (Q1) and the MOSFET transistor (Q3) are connected with the high voltage side of the photovoltaic panels, the source electrodes of the MOSFET transistor (Q2) and the MOSFET transistor (Q4) are connected with the low voltage side of the photovoltaic panels, the source electrode of the MOSFET transistor (Q1) is connected with the drain electrode of the MOSFET transistor (Q2), and the source electrode of the MOSFET transistor (Q3) is connected with the drain electrode of the MOSFET transistor (Q4). The four MOSFET transistors of the MOSFET transistor H full-bridge circuit are respectively provided with four protection circuits with the same structure. Take the MOSFET transistor (Q1) as an example. The protection circuit comprises a resistor R1, a capacitor C7 and a diode D7. The resistor R1 is connected with the capacitor C7 in series, and the connection between the resistor R1 and the capacitor C7 is connected with the cathode of the diode D7. The other terminal of the capacitor C7 is connected with the drain electrode of the MOSFET transistor (Q1), and the other terminal of the resistor R1 is connected with the source electrode of the MOSFET transistor (Q1) and the anode of the diode D7.

For connection of the high-frequency transformer 4, one terminal of the primary coil of the high-frequency transformer 4 is connected with the center of a bridge arm formed by the MOSFET transistor (Q1) and the MOSFET transistor (Q3), and the other terminal of the primary coil of the high-frequency transformer 4 is connected with the center of a bridge arm formed by the MOSFET transistor (Q2) and the MOSFET transistor (Q4); both terminals of the secondary coil of the high-frequency transformer 4 are respectively connected with the half-bridge rectifying circuit 5, and the central tap of the secondary coil of the high-frequency transformer 4 is connected with the SCR H full-bridge circuit 6.

The half-bridge rectifying circuit 5 comprises diodes and a filter capacitor. One terminal of the secondary coil of the high-frequency transformer 4 is connected with the anode of the diode D1, and the other terminal is connected with the anode of the diode D2. The cathode of the diode D1 is connected with one terminal of the filter capacitor C21, and the other terminal of the filter capacitor C21 is connected with the central tap of the secondary coil of the high-frequency transformer 4. The cathode of the diode D2 is connected with one terminal of the filter capacitor C22, and the other terminal of the filter capacitor C22 is connected with the central tap of the secondary coil of the high-frequency transformer 4.

The SCR H full-bridge circuit 6 comprises an SCR transforming bridge circuit. The SCR transforming bridge circuit comprises thyristors. The anodes of the thyristors D3 and D5 are connected with the cathodes of the diodes D1 and D2 in the half-bridge rectifying circuit 5, and the cathode of the thyristor D3 is connected with the anode of the thyristor D4. The cathode of the thyristor D5 is connected with the anode of the thyristor D6, the cathodes of the thyristors D5 and D6 are connected with the central tap of the secondary coil of the high-frequency transformer 4.

The thyristors are provided with protection circuits with the same structure, and each of the protection circuits comprises resistors and capacitors. Take the thyristor D3 as an example. One terminal of the resistor R5 and one terminal of the capacitor C12 are connected with the anode of the thyristor D3, and the other terminal of the capacitor C12 is connected with one terminal of the resistor R6; the other terminal of the resistor R6 and one terminal of the capacitor C11 are connected with the cathode of the thyristor D3, the other terminal of the capacitor C11 is connected with the gate of the thyristor D3, and the other terminal of the resistor R5 and the gate of the thyristor D3 are used as input terminals of driving signals.

The filter circuit 7 comprises a resistor, a capacitor and an inductor. The connection between the thyristor D3 and the thyristor D4 is connected with one terminal of the inductor L2, and the other terminal of the inductor L2 is connected with one terminal of the capacitor C19 and one terminal of the capacitor C20 and is connected to the grid. The other terminal of the capacitor C20 is connected with one terminal of the resistor R13, and the other terminal of the resistor R13 is connected with the other terminal of the capacitor C19 and is connected to the grid.

Requirements for design parameters of the components and the circuits used in the embodiment of the present invention are shown as follows:

1. For power MOSFET transistors including Q1, Q2, Q3 and Q4, the formula required for parameter selection is as follows:

The maximum voltage and the maximum current of the MOSFET transistors are:

$$U_{ds} = U_{PV} + U_{reflected} + U_{leakge} \quad (1)$$

Where, $U_{ds}$: Maximum voltage applied between the drain electrodes and the source electrodes of the MOSFET transistors; $U_{PV}$: Voltage inputted by the photovoltaic panels; $U_{reflected}$: Primary output reflected voltage of the transformer when all the MOSFET transistors are closed; and $U_{leakge}$: Leakage peak voltage for leakage of magnetic inductance of the transformer.

$$I_{dsavmax} = \frac{P_{pvmax}}{U_{PVmin}} \quad (2)$$

where, $I_{dsavmax}$: Maximum average input current for the MOSFET transistors; $P_{pvmax}$: Maximum power inputted by the photovoltaic panels; and $U_{PVmin}$: Minimum voltage inputted by the photovoltaic panels.

Then, the maximum input current $I_{ds\ max}$ is:

$$I_{dsmax} = \frac{I_{dsavmax}}{\text{Duty max}} \quad (3)$$

where, $I_{ds\ max}$: Maximum input current for the MOSFET transistors; and Duty max: Maximum duty ratio for conduction of the MOSFET transistors.

Then, the maximum sine input current is:

$$I_{dszx} = \sqrt{2} * I_{ds\ max} \quad (4).$$

The maximum peak-to-peak value of ripple current is generally 20%, so the maximum current $I_{DS}$ for the MOSFET transistors are:

$$I_{DS} = I_{dszx} + 0.2 * I_{dszx} \quad (5).$$

Calculation of number of turns for windings required for selection of the transformer T1 with a central tap. Number of turns for the primary winding:

$$N_P = \frac{U_{PVmin} * Dutymax}{\Delta B * F_{PWM} * A_e} \quad (6)$$

where, $N_P$: Number of turns for the primary winding of the transformer; $U_{PV\ min}$: Minimum input voltage for the solar photovoltaic panels; $\Delta B$: Variable of magnetic flux at the magnetic core; $F_{PWM}$: Switching frequency of the MOSFET transistors; and $A_e$: Geometric size of magnetic core components.

Number of turns $N_S$ for the secondary winding is calculated as follows:

$$\frac{N_S}{N_P} = \frac{(U_{gridmax} + U_{D1,ON})}{(U_{PV\ min} - 2U_{MOSFET,ON})}$$

where, $U_{grid\ max}$: Peak value of the grid voltage; $U_{D1,ON}$: Voltage drop during conduction of diodes of the half-wave rectifier bridge; $U_{PV\ min}$: Minimum voltage inputted by the photovoltaic panels; and $U_{MOSFET,ON}$: Voltage drop during conduction of the MOSFET transistors.

Calculation of parameters required during selection of half-wave rectifier diode D1 (calculation method for selecting D2 is the same as that of D1). The maximum voltage and the maximum current for the half-wave rectifier diode are:

$$U_S = U_{PV\ max} * N_S/N_P + U_{grid\ max} \quad (8)$$

where, $U_S$: Maximum voltage for the half-wave rectifier diode; and $U_{PV\ max}$: Maximum voltage inputted by the photovoltaic panels.

$$I_S = I_{DS} * \frac{N_P}{N_S} \quad (9)$$

Where, $I_S$: Maximum current for the half-wave rectifier diode; and $I_{DS}$: Maximum current for the MOSFET transistors.

Calculation of parameters required during selection of SCR D1 (calculation method for selecting D4, D5 and D6 is the same as that of D3). The maximum voltage and the maximum current for SCR are:

$$U_{SCR} = 2 * U_{grid\ max} \quad (10)$$

where, $U_{SCR}$: Maximum voltage for the thyristor (SCR).

$$I_{SCR} = \frac{P_{output\ max}}{U_{grid}} \quad (11)$$

Where, $I_{SCR}$: Operating current for the thyristor (SCR) in maximum power; $P_{output\ max}$: Maximum output power; and $U_{grid}$: Grid voltage.

Then, the maximum current $I_{SCRmax}$ for SCR is:

$$I_{SCR\ max} = \sqrt{2} * I_{SCR} \quad (12).$$

Measuring methods for the measuring circuit are also optimized to increase the measuring accuracy and reduce the complexity.

Figure 5:
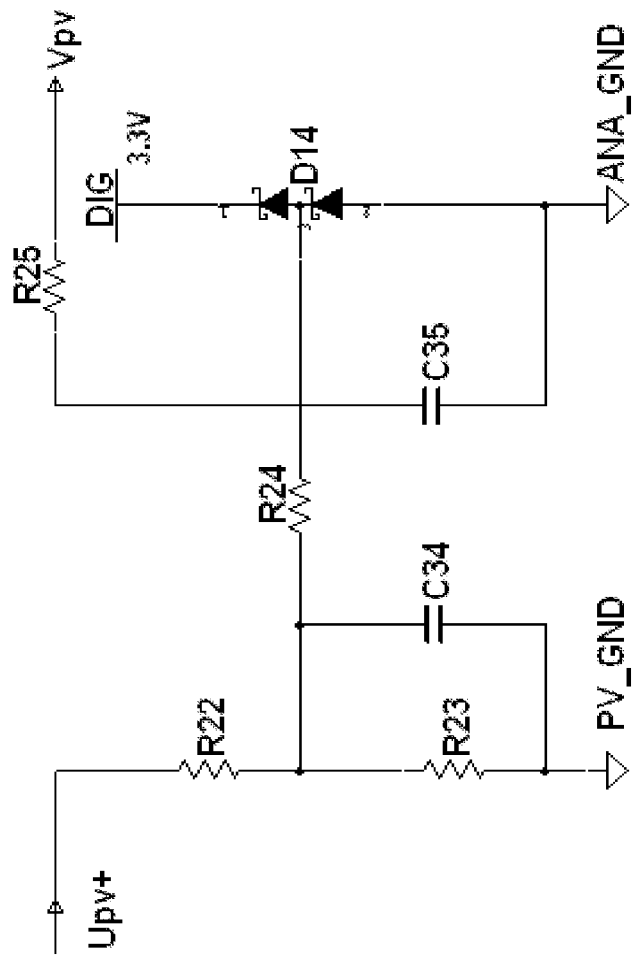
FIG. 5 is the schematic diagram of the DC voltage detecting circuit in the present invention.

FIG. 5 is the DC voltage detecting circuit. In the present invention, the simplest voltage divider detecting circuit is used, rather than transformers or other components to reduce the complexity, increase detection accuracy and achieve economical effectiveness and high efficiency. The voltage output terminals Upv+ and Upv− of the solar photovoltaic panels are respectively connected with Upv+ and PV_GND terminals of the DC voltage detecting circuit, and the Vpv output terminal of the DC voltage detecting circuit is connected with the analog input channel of the single-chip microcomputer controller.

Figure 6:
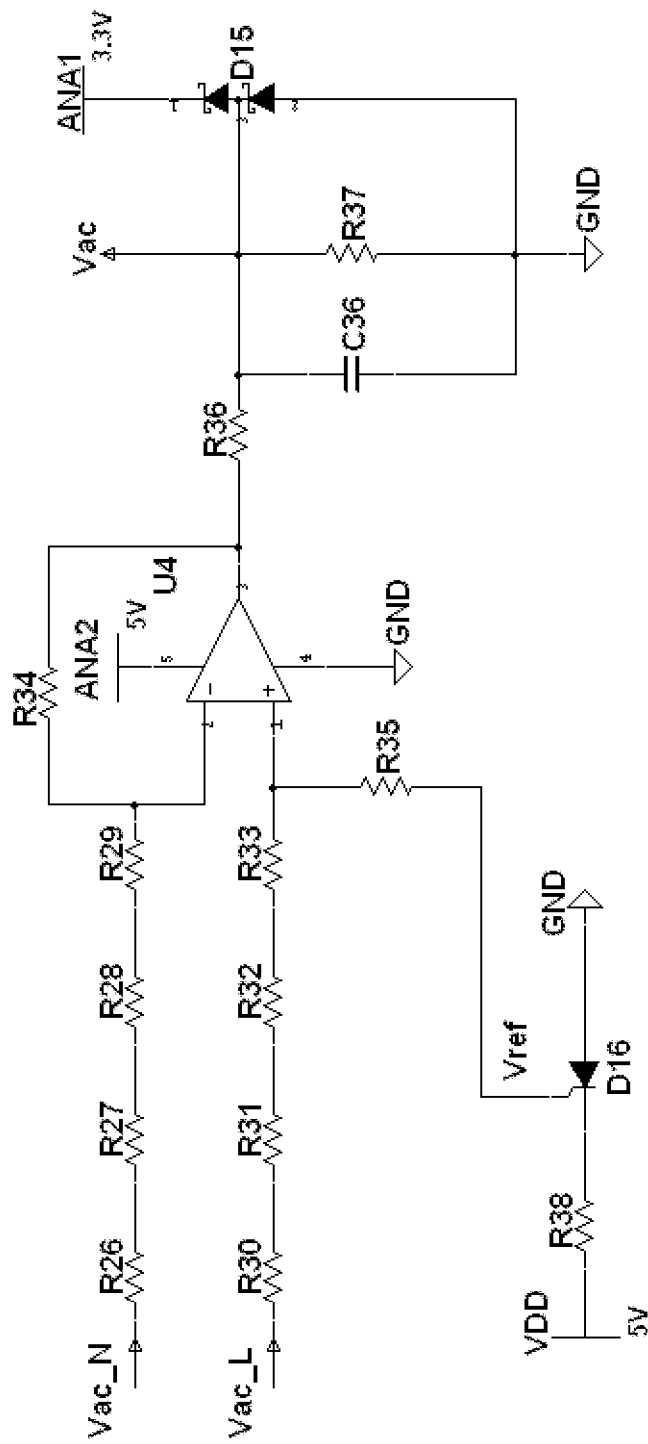
FIG. 6 is the schematic diagram of the AC voltage detecting circuit in the present invention.

The embodiment includes 2 AC voltage detecting circuits, as shown in FIG. 6. Only voltage signals from 0V to 3.3V are available to the ADC module of the single-chip microcomputer controller, so the traditional resistance divider network detecting method cannot be used. In the present invention, the differential amplifier U4 is used to narrow high-voltage AC signals, and the offset voltage (such as 2.5V) of Vref is applied. The offset voltage of Vref enables the midpoint of the bidirectional AC detecting voltage to be close to the DC offset voltage Vref. Then, the resistance divider is used to ensure that the voltage of detecting signals on the analog pin of the single-chip microcomputer is within the range of 0 to 3.3V to effectively utilize the available voltage range of ADC. In the SCR H full-bridge circuit, the connection between the cathode of D5 and the anode of D6 forms the first voltage terminal, and the connection between the cathode of D3 and the anode of D4 forms the second voltage terminal. The Vac_L input terminal and the Vac_N input terminal of the first AC voltage detecting circuit are respectively connected with the first voltage terminal and the second voltage terminal, and the Vac output terminal of the AC voltage detecting voltage is connected with the analog input channel of the single-chip microcomputer controller. After filtered, the AC voltage is transmitted to the grid. The connection between one terminal of R13 and one terminal of C19 in the filter circuit forms the first voltage terminal, and the connection between L2, C20 and the other terminal of C19 forms the second voltage terminal. The Vac_L input terminal and the Vac_N input terminal of the second AC voltage detecting circuit are respectively connected with the first voltage terminal and the second voltage terminal, and the Vac output terminal of the AC voltage detecting circuit is connected with the analog input channel of the single-chip microcomputer controller.

Figure 7:
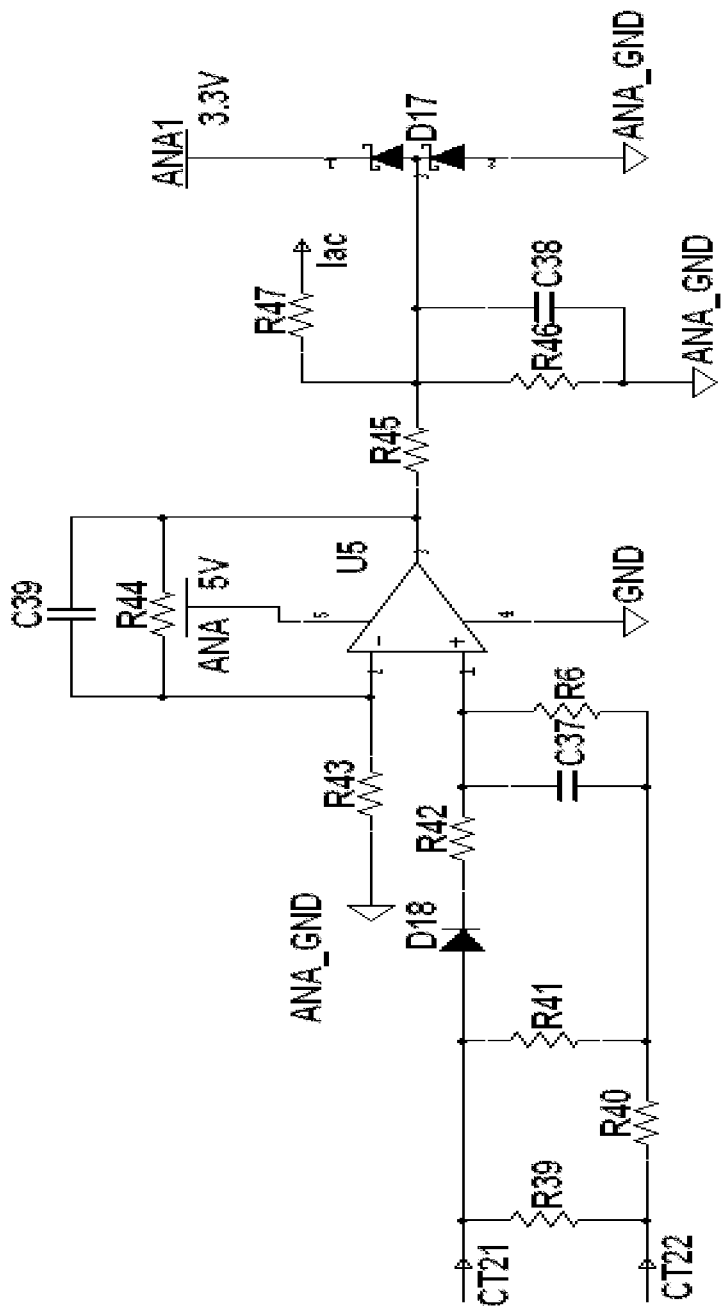
FIG. 7 is the schematic diagram of the AC detecting circuit in the present invention.

FIG. 7 is the diagram of the AC detecting circuit, and the embodiment includes 2 AC detecting circuits. A current transformer (CT) is used to measure AC for current isolation and cost reduction. When a CT is selected, the resistance of the detecting current should be as low as possible, and then, the voltage for both terminals of the load resistor is maximized enough so as to effectively utilize the voltage detecting range of ADC. In the MOSFET H full-bridge circuit, the connection between the source electrode of Q3 and the drain electrode of Q4 forms the first current terminal, and the connection between the source electrode of Q1 and the drain electrode of Q2 forms the second current terminal. Input terminals CT21 and CT22 of the first AC detecting circuit are respectively connected with the first current terminal and the second current terminal, and the Iac output terminal of the first AC detecting circuit is connected with the analog input channel of the single-chip microcomputer controller. In the SCR H full-bridge circuit, the connection between the cathode of D5 and the anode of D6 forms the first current terminal, and the connection between the cathode of D3 and the anode of D4 forms the second current terminal. Input terminals CT21 and CT22 of the second AC detecting circuit are respectively connected with the first current terminal and the second current terminal, and the Iac output terminal of the second AC detecting circuit is connected with the analog input channel of the single-chip microcomputer controller.

Figure 8:
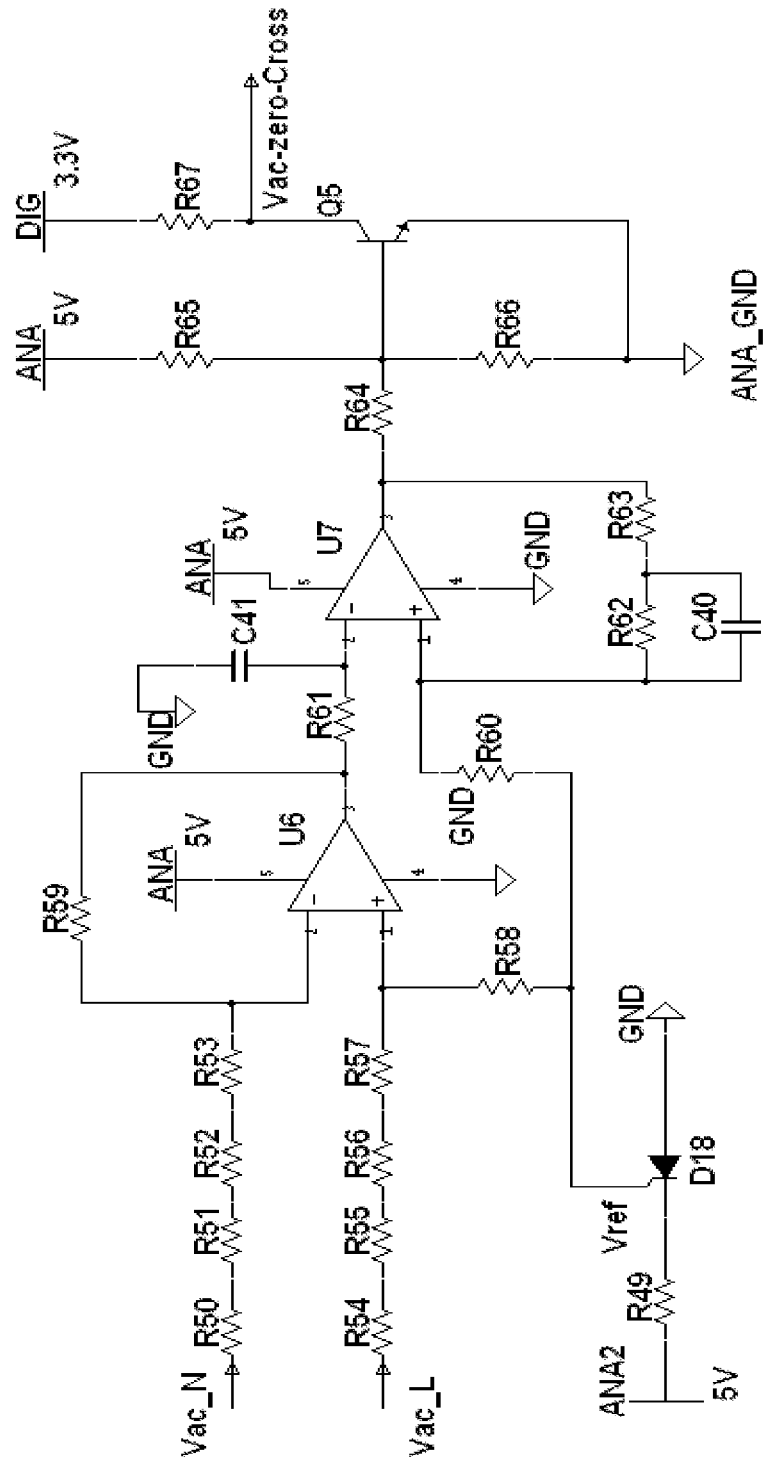
FIG. 8 is the schematic diagram of the zero-cross detecting circuit in the present invention.

Zero-cross detection is essential to the operation of the whole system, as shown in FIG. 8. Output of the inverter should be at the same phase and the same frequency compared with the grid voltage to feed current in the power factor of 1. Therefore, during zero-cross detection, the differential amplifier is used firstly to reduce the grid voltage, and meanwhile, a Vref offset voltage is applied. Then, output voltage of the differential amplifier is compared with Vref through a comparator. The output of the comparator is used to drive the base electrode of the transistor Q5, and zero-cross detection signals are output through the collecting electrode of the transistor Q5. To avoid transmitting the comparator by mistake, a hysteresis voltage of about 10 mV is applied to the comparator through R62, R63 and C40. The AC voltage is transmitted to the grid after filtering. The connection between one terminal of R13 and one terminal of C19 forms the first voltage terminal, and the connection between L2, C20 and the other terminal of C19 forms the second voltage terminal. The Vac_L input terminal and the Vac_N input terminal of the zero-cross detecting circuit are respectively connected with the first voltage terminal and the second voltage terminal, and the Vac-zero-cross output terminal of the zero-cross detecting circuit is connected with the analog input channel of the single-chip microcomputer controller.

All the detecting signals are transmitted to the analog input port of the single-chip microcomputer controller, and all the input signals are obtained after AD sample conversion is performed by the ADC module in the single-chip microcomputer controller. The input signals are calculated through the MPPT algorithm (maximum power point tracking algorithm) and the digital phase-locked loop to generate reference signals of sinusoidal alternating current. The MPPT algorithm ensures that the solar photovoltaic panels operate in the maximum power, and the digital phase-locked loop ensures that the voltage and the current of the inverter are of the same frequency and the same phase as those of the grid. After the generated reference signals of the sinusoidal alternating current obtained by calculation are compared with that of the real alternating current obtained after detection, the duty ratio of the MOSFET transistors to be conducted is calculated through PI control. Then, the data are transmitted to ports A0 to A15 of CPLD through ports A0 to A15, and the CLK port of the single-chip microcomputer controller is connected with the CLK port of CPLD. Two groups of SPWM waves and one group of PWM waves are obtained by CPLD through calculation of the obtained calculation data. The SPWM waves are transmitted to the MOSFET driving circuit through the ports SPWM1H(2H) and SPWM1L(2L), and the PWM waves are transmitted to the SCR driving circuit through PWMH(L).

Input output relationship and duty ratio:

$$U_{OUT} = \frac{U_{PVmin} * N * \text{Duty max}}{1 - \text{Duty max}} \quad (13)$$

where, $U_{OUT}$: Output voltage of the inverter; and N: Transformer ratio.

Figure 9A:
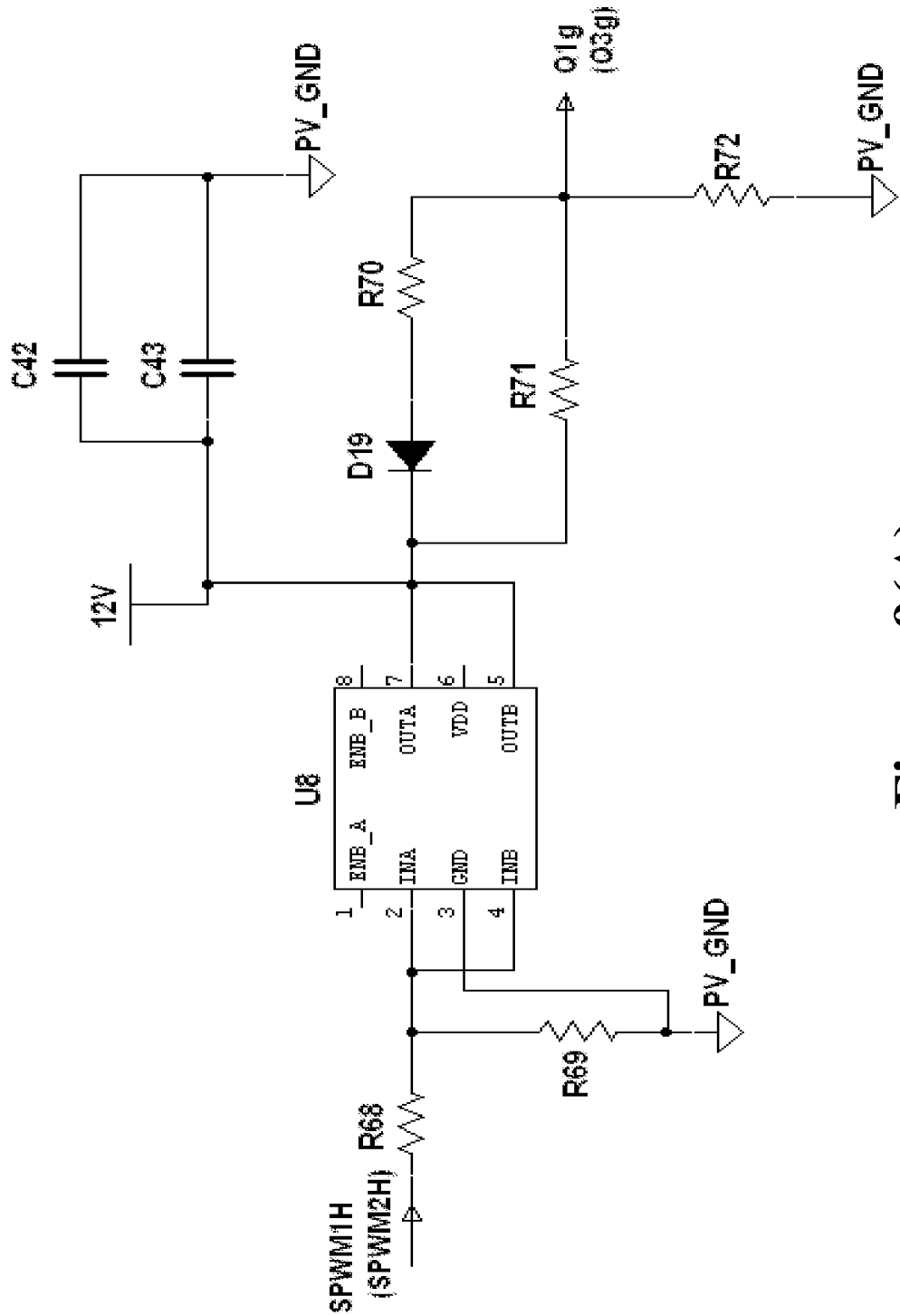
FIG. 9(A) is the schematic diagram of the gate driving circuit of MOSFETQ1 and Q3 in the present invention.
Figure 9B:
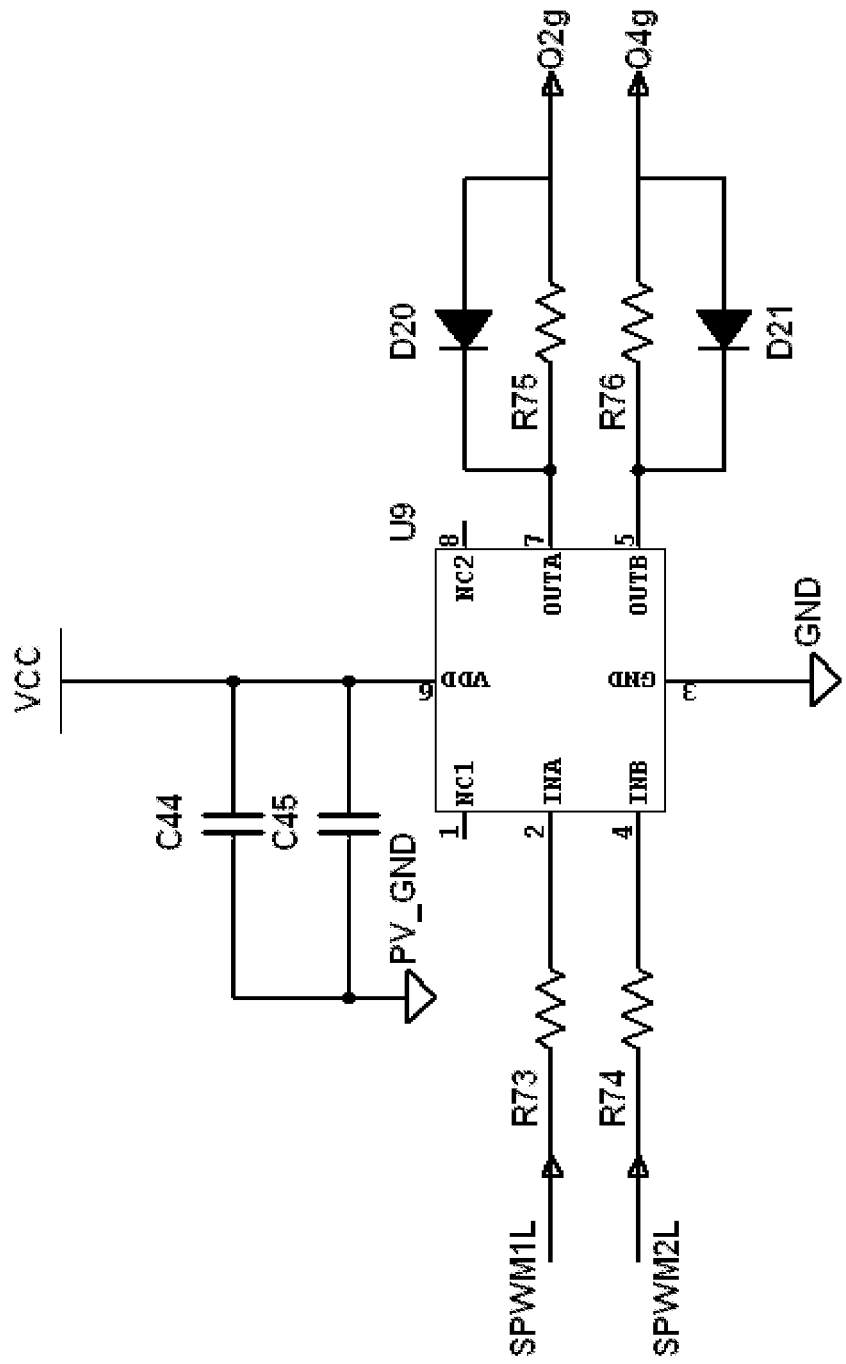
FIG. 9(B) is the schematic diagram of the gate driving circuit of MOSFETQ2 and Q4 in the present invention.

In the design of the driving circuit, losses of the driving circuit are further reduced based on characteristics of the switches. FIG. 9A is the diagram of the gate driving circuit of MOSFET Q1 and Q3, and the driving circuits of Q1 and Q3 are the same. FIG. 9B is the diagram of the gate driving circuit of MOSFET Q2 and Q4, and the driving circuits of Q2 and Q4 are the same. The design has the advantages of simplified driving circuit and cost reduction. A backward diode is connected with the gate driving resistor of the MOSFET transistors in the cross-over mode (for Q1 and Q3, the backward diode is D19; for Q2 and Q4, the backward diodes are D20 and D21) to quickly close the MOSFET transistors in a high frequency and further reduce losses for opening and closing the MOSFET transistors. After passing through the MSOFET driving circuit, the SPWM waves are respectively connected with the gates of the MOSFET transistors Q1, Q2, Q3 and Q4 through the output terminals Q1g, Q2g, Q3g and Q4g to control the MOSFET transistors and generate high-frequency AC.

Figure 10:
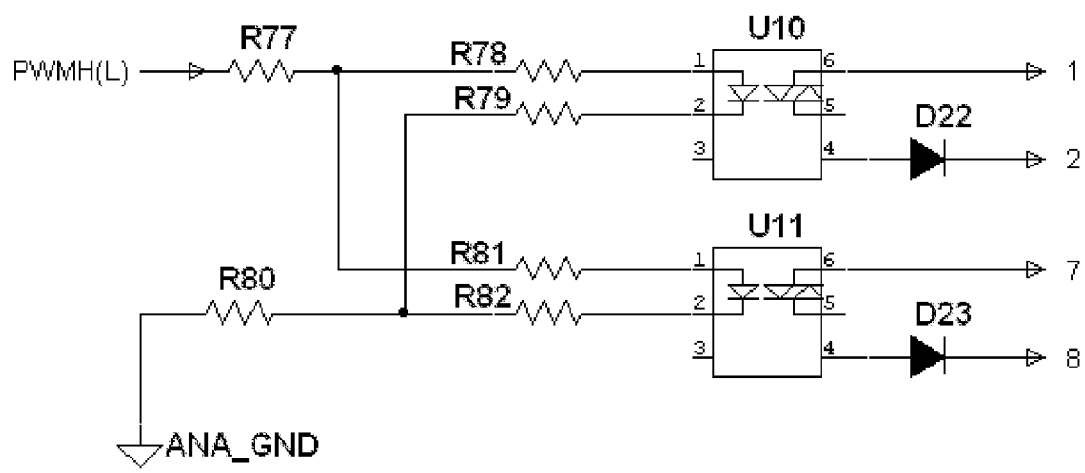
FIG. 10 is the schematic diagram of the SCR gate driving circuit in the present invention.

During driving of the SCR gates, an optical coupler isolator is used to improve reliability of the driving circuit, as shown in FIG. 10. By utilizing the advantages of the circuit topology design, requirements for the number of paths of PWM signals are reduced, and costs of the driving circuit and control complexity are reduced. When PWMH is input, the output terminal 1 is connected with the other terminal of the resistor R5 in the protection circuit of D3, and the output terminal 2 is connected with the gate of D3; the output terminal 7 is connected with the other terminal of the resistor R11 in the protection circuit D6, and the output terminal 8 is connected with the gate of D6. When PWML is input, the output terminal 1 is connected with the other terminal of the resistor R7 in the protection circuit of D4, and the output terminal 2 is connected with the gate of D4; the output terminal 7 is connected with the other terminal of the resistor R9 in the protection circuit of D5, and the output terminal 8 is connected with the gate of D5. After passing through the SCR driving circuit, the PWM waves control SCR to make conversion of half sine waves to sine waves which conform to the grid-connected standard.

Serial ports and upper computers (PC) are used for communication. Upper computers have the functions of displaying all the parameters collected by lower computers, warning for overvoltage, overcurrent, undervoltage, islanding, etc., and writing data to the ACCESS database.

What is claimed is:

1. An H-bridge micro inverter grid-connected device, comprising:
a PIC single-chip microcomputer controller processing and calculating collected signals;
a CPLD controller outputting pulse signals, wherein the pulse signals include two groups of SPWM waves and one group of PWM waves;
an MOSFET H full-bridge circuit inverting DC signals outputted by photovoltaic panels to high-frequency AC signals;
a high-frequency transformer boosting the voltage of the high-frequency AC signals inverted by the MOSFET H full-bridge circuit to the voltage which conforms to a grid-connected amplitude;
a half-bridge rectifying circuit converting output signals of the high-frequency transformer to half sine wave signals;
an SCR H full-bridge circuit converting the half sine wave signals outputted by the half-bridge rectifying circuit to sine wave signals which conform to grid requirements; and
a filter circuit filtering harmonic waves in the sine waves outputted by the SCR H full-bridge circuit and converting the output sine waves to sine waves which conform to grid requirements;
wherein the SPWM waves control the MOSFET H full bridge to generate the high-frequency AC signals, and the PWM waves control the SCR H full-bridge to convert the half sine wave signals outputted by the half-bridge rectifying circuit to the sine wave signals.

2. The H-bridge micro inverter grid-connected device as claimed in claim 1, wherein the MOSFET H full-bridge circuit comprises a MOSFET transistor H full-bridge circuit and protection circuits, wherein drain electrodes of a first MOSFET transistor and a third MOSFET transistor of the MOSFET H full-bridge circuit are connected with a high voltage side of the photovoltaic panels, and source electrodes of a second MOSFET transistor and a fourth MOSFET transistor of the MOSFET transistor H full-bridge circuit are connected with a low voltage side of the photovoltaic panels; a source electrode of the first MOSFET transistor is connected with a drain electrode of the second MOSFET transistor, and a source electrode of the third MOSFET transistor is connected with a drain electrode of the fourth MOSFET transistor.

3. The H-bridge micro inverter grid-connected device as claimed in claim 2, wherein each of the first to fourth MOSFET transistors of the MOSFET transistor H full-bridge circuit is provided with a protection circuit comprising a resistor, a capacitor and a diode, the resistor has one terminal is connected with one terminal of the capacitor in series, and a connection between the resistor and the capacitor is connected with a cathode of the diode; the other terminal of the capacitor is connected with the drain electrode of the MOSFET transistor, and the other terminal of the resistor is connected with the source electrode of the MOSFET transistor and an anode of the diode.

4. The H-bridge micro inverter grid-connected device as claimed in claim 2, wherein one terminal of a primary coil of the high-frequency transformer is connected with a center node of a bridge arm formed by the first MOSFET transistor and the third MOSFET transistor, and the other terminal of the primary coil of the high-frequency transformer is connected with a center node of a bridge arm formed by the second MOSFET transistor and the fourth MOSFET transistor; both terminals of a secondary coil of the high-frequency transformer are respectively connected with the half-bridge rectifying circuit, and a central tap of the secondary coil of the high-frequency transformer is connected with the SCR full-bridge circuit.

5. The H-bridge micro inverter grid-connected device as claimed in claim 4, wherein the half-bridge rectifying circuit comprises diodes and filter capacitors, one terminal of the secondary coil of the high-frequency transformer is connected with an anode of a first diode of the diodes, and the other terminal of the secondary coil of the high-frequency transformer is connected with an anode of a second diode of the diodes; a cathode of the first diode is connected with one terminal of the first filter capacitor of the filter capacitors, and the other terminal of the first filter capacitor is connected with the central tap of the secondary coil of the high-frequency transformer; a cathode of the second diode is connected with one terminal of a second filter capacitor of the filter capacitors, and the other terminal of the second filter capacitor is connected with the central tap of the secondary coil of the high-frequency transformer.

6. The H-bridge micro inverter grid-connected device as claimed in claim 4, wherein the SCR H full-bridge circuit comprises an SCR transforming bridge circuit having a plurality of thyristors; anodes of both a first thyristor and a third thyristor of the thyristors are connected with cathodes of a first diode and a second diode in the half-bridge rectifying circuit, and a cathode of the first thyristor is connected with an anode of a second thyristor of the thyristors; a cathode of the third thyristor is connected with an anode of a fourth thyristor of the thyristors, cathodes of the third thyristor and the fourth thyristor are connected with the central tap of the secondary coil of the high-frequency transformer.

7. The H-bridge micro inverter grid-connected device as claimed in claim 6, wherein each of the thyristors is provided with protection circuits comprising resistors and capacitors; one terminal of a first resistor of the resistors and one terminal of a first capacitor of the capacitors are connected with the anode of the thyristor, and the other terminal of the first capacitor is connected with one terminal of a second resistor of the resistors; the other terminal of the second resistor and one terminal of a second capacitor of the capacitors are connected with the cathode of the thyristor, the other terminal of the second capacitor is connected with a gate of the thyristor, and the other terminal of the first resistor and the gate of the thyristor are used as input terminals of voltage driving signals.

8. The H-bridge micro inverter grid-connected device as claimed in claim 6, wherein the filter circuit comprises a resistor, capacitors and an inductor, the connection between the first thyristor and the second thyristor is connected with one terminal of the inductor, and the other terminal of the inductor is connected with one terminal of a first capacitor, one terminal of a second capacitor and a grid; the other terminal of the second capacitor is connected with one terminal of the resistor, and the other terminal of the resistor is connected with the other terminal of the first capacitor and the grid.

9. The H-bridge micro inverter grid-connected device as claimed in claim 1, wherein the half-bridge rectifying circuit comprises diodes and filter capacitors, one terminal of a secondary coil of the high-frequency transformer is connected with an anode of a first diode of the diodes, and the other terminal of the secondary coil of the high-frequency transformer is connected with an anode of a second diode of the diodes; a cathode of the first diode is connected with one terminal of a first filter capacitor of the filter capacitors, and the other terminal of the first filter capacitor is connected with a central tap of the secondary coil of the high-frequency transformer; a cathode of the second diode is connected with one terminal of a second filter capacitor of the filter capacitors, and the other terminal of the second filter capacitor is connected with the central tap of the secondary coil of the high-frequency transformer.

10. The H-bridge micro inverter grid-connected device as claimed in claim 1, wherein the SCR H full-bridge circuit comprises an SCR transforming bridge circuit having a plurality of thyristors; anodes of both a first thyristor and a third thyristor of the thyristors are connected with cathodes of a first diode and a second diode in the half-bridge rectifying circuit, and a cathode of the first thyristor is connected with an anode of a second thyristor of the thyristors; a cathode of the third thyristor is connected with an anode of a fourth thyristor of the thyristors, cathodes of the third thyristor and the fourth thyristor are connected with a central tap of a secondary coil of the high-frequency transformer.

11. The H-bridge micro inverter grid-connected device as claimed in claim 7, wherein the filter circuit comprises a resistor, capacitors and an inductor, the connection between the first thyristor and the second thyristor is connected with one terminal of the inductor, and the other terminal of the inductor is connected with one terminal of a first capacitor, one terminal of a second capacitor and a grid; the other terminal of the second capacitor is connected with one terminal of the resistor, and the other terminal of the resistor is connected with the other terminal of the first capacitor and the grid.

12. The H-bridge micro inverter grid-connected device as claimed in claim 10, wherein each of the thyristors is provided with protection circuits comprising resistors and capacitors; one terminal of a first resistor of the resistors and one terminal of a first capacitor of the capacitors are connected with the anode of the thyristor, and the other terminal of the first capacitor is connected with one terminal of a second resistor of the resistors; the other terminal of the second resistor and one terminal of a second capacitor of the capacitors are connected with the cathode of the thyristor, the other terminal of the second capacitor is connected with a gate of the thyristor, and the other terminal of the first resistor and the gate of the thyristor are used as input terminals of voltage driving signals.

* * * * *